J. A. & W. V. McCONNELL.
Churn.
No. 198,806. Patented Jan. 1, 1878.
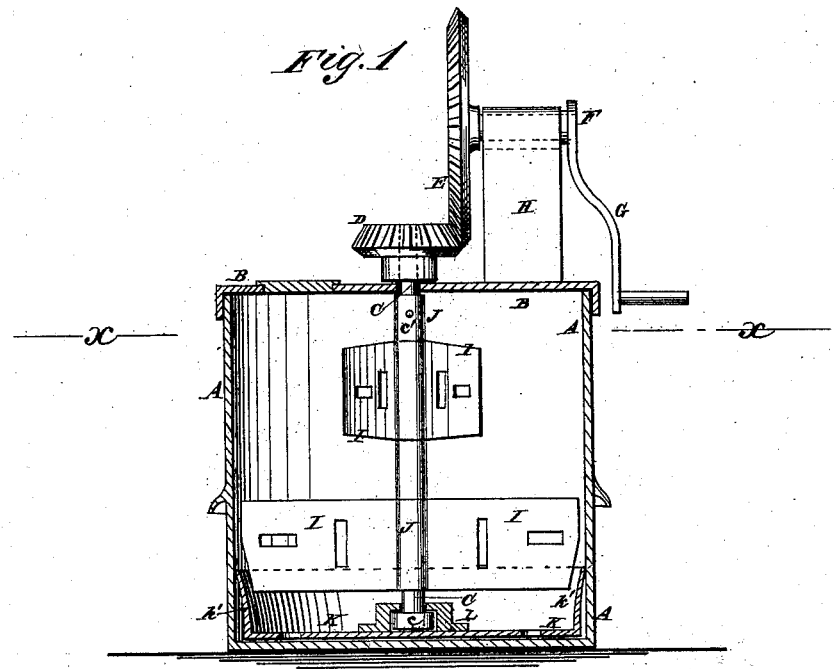
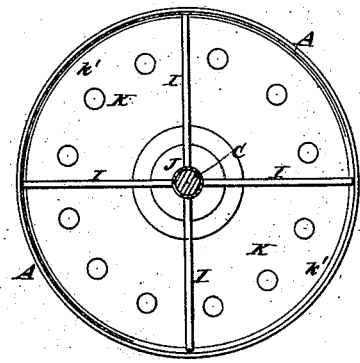
WITNESSES:
A. W. Almqvist
J. H. Scarborough.
INVENTORS
J. A. McConnell.
W. V. McConnell.
BY
Munn &Co
ATTORNEYS.

UNITED STATES PATENT OFFICE.

JOHN A. McCONNELL AND WILLIAM V. McCONNELL, OF CROCKETT, TEXAS.

IMPROVEMENT IN CHURNS.

Specification forming part of Letters Patent No. 198,806, dated January 1, 1878; application filed September 29, 1877.

*To all whom it may concern:*

Be it known that we, JOHN A. McCONNELL and WILLIAM V. McCONNELL, of Crockett, in the county of Houston and State of Texas, have invented a new and useful Improvement in Churns, of which the following is a specification:

Figure 1 is a vertical section of a churn to which our improvement has been applied. Fig. 2 is a top view of the same, the cover and its attachments being removed, and the dasher-shaft being shown in section through the line *x x*, Fig. 1.

Similar letters of reference indicate corresponding parts.

The object of this invention is to furnish an improved churn which shall be so constructed as to bring the butter in a very short time, and enable the butter to be readily taken from the churn, and which shall be simple in construction and convenient in use.

The invention will first be described in connection with the drawings, and then pointed out in the claim.

A represents the churn-body, which is made cylindrical in form, may be made of wood, tin, or earthenware, and may be of any desired size. The churn-body A is provided with a closely-fitting but easily-detachable cover, B, which may be secured in place by hooks or other convenient fastenings, and has a hole formed through its center for the passage of the dasher-shaft C. The upper end of the dasher-shaft C is squared, and upon it is placed a small bevel-gear wheel, D, which may be secured in place, detachably, by a pin or key. The teeth of the gear-wheel D mesh into the teeth of a larger gear-wheel, E, attached to the inner end of the shaft F, to the outer end of which is attached the crank G. The shaft F revolves in bearings in the bracket H, attached to the cover B.

By this construction the dasher-shaft and the cover and its attachments may be removed together, or, by disconnecting the gear-wheel D from the dasher-shaft C, the cover B and its attachments may be removed without removing the dasher-shaft.

I are the dasher-arms, wings, or paddles, the inner ends of which are attached to the sleeve J, and which have holes or short slots formed in them, to cause them to operate more effectively upon the milk. The sleeve J is secured in place upon the shaft C by a pin, $c'$, so that the dashers can be readily detached when desired. The lower end of the dasher-shaft C is swiveled to the disk K, which fits upon the bottom of the churn-body A, is perforated with numerous small holes, and has an upwardly-projecting flange, $k'$, formed around its edge. The shaft C is provided with a round head or enlargement, $c$, at its lower end, that is secured in a box, L, attached to the middle of disk K, so as to rotate and allow the butter-pan to be lifted out with it.

With this construction the disk K $k'$ will be raised by and with the dasher-shaft C, and will take all the butter with it, the buttermilk escaping through the holes in the said disk. The dasher-shaft may have a shoulder or collar formed upon or attached to it at the lower side of the cover B, to hold it down to its place when at work.

Having thus described our invention, we claim as new and desire to secure by Letters Patent—

The dasher-shaft C of a churn, having head $c$ on the lower end, in combination with a box, L, attached to the middle of butter-pan K, as and for the purpose specified.

JOHN A. McCONNELL.
WILLIAM V. McCONNELL.

Witnesses:
J. H. WALL,
CHAS. HERRING.